«12» United States Patent
Fiore et al.

«10» Patent No.: US 11,747,203 B2
«45» Date of Patent: Sep. 5, 2023

«54» MULTI-PIXEL SPECTRAL SENSOR

«71» Applicant: TECHNISCHE UNIVERSITEIT EINDHOVEN, Eindhoven (NL)

«72» Inventors: Andrea Fiore, Eindhoven (NL); Kaylee Doranne Hakkel, Eindhoven (NL); Tianran Liu, Eindhoven (NL); Francesco Pagliano, Eindhoven (NL); Maurangelo Petruzzella, Eindhoven (NL)

«73» Assignee: MANTISPECTRA B.V., Eindhoven (NL)

«*» Notice: Subject to any disclaimer, the term of this patent is extended or adjusted under 35 U.S.C. 154(b) by 192 days.

«21» Appl. No.: 17/436,186

«22» PCT Filed: Jan. 28, 2020

«86» PCT No.: PCT/NL2020/050044
§ 371 (c)(1),
(2) Date: Sep. 3, 2021

«87» PCT Pub. No.: WO2020/180174
PCT Pub. Date: Sep. 10, 2020

«65» Prior Publication Data
US 2022/0128408 A1    Apr. 28, 2022

Related U.S. Application Data

«60» Provisional application No. 62/815,247, filed on Mar. 7, 2019.

«51» Int. Cl.
G01J 3/28        (2006.01)
G01J 3/02        (2006.01)

«52» U.S. Cl.
CPC ............ G01J 3/2823 (2013.01); G01J 3/021 (2013.01); G01J 2003/2806 (2013.01)

«58» Field of Classification Search
CPC ... G01J 2003/2806; G01J 3/021; G01J 3/2823
See application file for complete search history.

«56» References Cited

U.S. PATENT DOCUMENTS

2009/0236525 A1* 9/2009 Mitra ................... G01J 3/2823
                                                         356/519
2017/0234726 A1   8/2017 Ockenfuss
(Continued)

FOREIGN PATENT DOCUMENTS

CN    101866933 B  * 11/2011
CN    108426639 A  *  8/2018  ............ G01J 3/2803
(Continued)

OTHER PUBLICATIONS

International Search Report dated Jul. 3, 2020 for PCT/NL2020/050044.
(Continued)

Primary Examiner — Maurice C Smith
(74) Attorney, Agent, or Firm — Suiter Swantz pc llo

«57» ABSTRACT

A multi-pixel spectroscopy sensor for spectral analysis of a sample under test including an array of pixel elements generating a dataset including a plurality of data values corresponding to the pixel elements upon illumination of the sample by a light source. Each of the pixel elements including a stack of layers including first and second reflective structures, a phase tuning element, a detector element, and contact elements. The sensor further includes a read-out circuit connected to each of the contact elements for simultaneous read-out of a plurality of photocurrents for generating and outputting the dataset for the spectral analysis of the sample under test. The phase tuning element of each of the pixel elements is configured for a different wavelength response of the light and each photodetector of the pixel elements is comprised of a semiconductor material.

18 Claims, 10 Drawing Sheets

(56) References Cited

U.S. PATENT DOCUMENTS

2017/0309758 A1 10/2017 Frey et al.
2018/0212080 A1* 7/2018 Meyer .................. H01L 31/105

FOREIGN PATENT DOCUMENTS

| JP | 2000031510 A | 1/2000 | | |
|---|---|---|---|---|
| WO | WO-2004071066 A2 * | 8/2004 | ....... | H01L 27/14618 |
| WO | WO-2006044983 A2 * | 4/2006 | ....... | H01L 27/14652 |

OTHER PUBLICATIONS

Lai, Kuo-Wei et al., "Selecting detection wavelength of resonant cavity-enhanced photodetectors by guided-mode resonance reflectors", Optics Express, vol. 20, No. 4, Feb. 13, 2012, 8 pages.

* cited by examiner

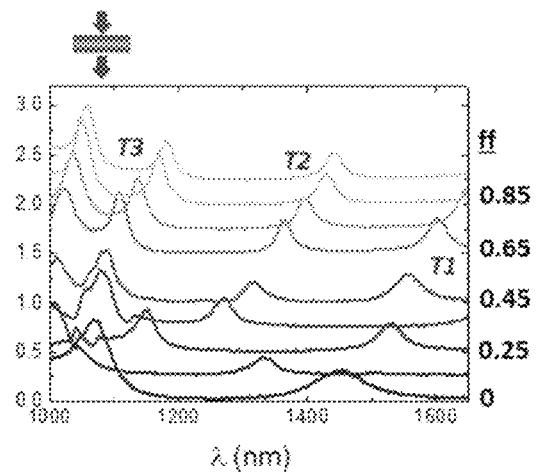
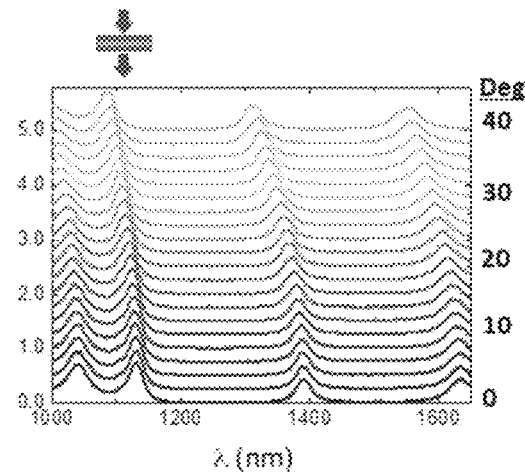
Fig. 6a
Fig. 6b
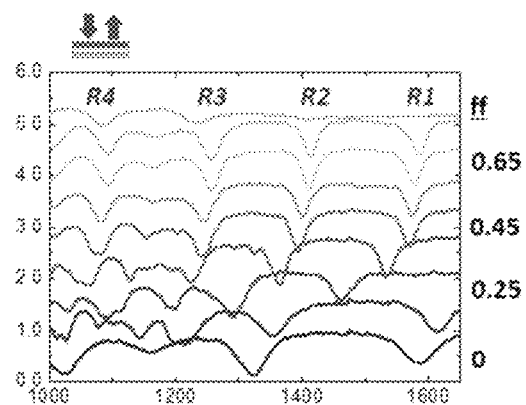
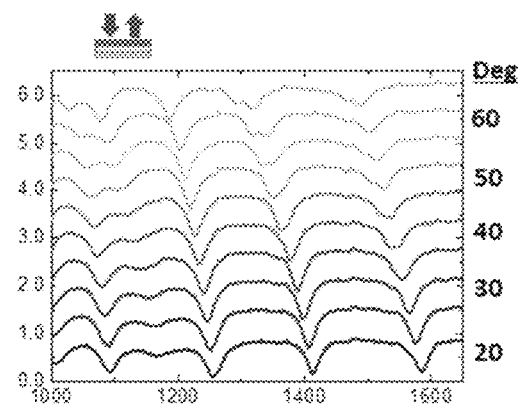
Fig. 6c
Fig. 6d

MULTI-PIXEL SPECTRAL SENSOR

TECHNICAL FIELD

The present invention relates in general to spectral sensing systems, and more in particular, to multi-pixel spectral sensors for spectral analysis of a sample under test.

The present invention further relates to a method of manufacturing a multi-pixel spectral sensor for spectral analysis of a sample under test.

BACKGROUND

Spectral sensors have been used for decades in many laboratories worldwide for identifying and quantifying chemical compositions of materials based on their emission, reflection or transmission spectra. Nowadays, they are an important tool in industrial and agricultural applications for performing spectral analysis on samples. Also in the consumers' market, for example for monitoring food quality, as well as in the health care market there is a growing need for such tools.

Spectral sensor systems make use of optical spectroscopy which determines the spectral properties of a (test) sample of a material. The interaction of a sample with light is enhanced when the photon energy matches (multiple of) the energies of electronic, vibrational or rotational transitions in the material. This produces resonances in the spectrum of light transmitted, reflected, emitted or scattered from the sample. The resonances can be used to identify the chemical composition of the sample. The sensor system to this end, generates, based on the measured reflected, transmitted, emitted or scattered light, what may be called a spectral fingerprint by which materials composing the sample can be quantify, identified or classified, i.e. by comparing the measured spectral fingerprint with the fingerprint of known, reference fingerprints. If the measured fingerprint corresponds with that of a reference fingerprint, it may be concluded that the measured sample is the material of the reference with the corresponding fingerprint.

Spectral sensor systems are complex, large and expensive devices and one of the objects of improving known spectral sensor systems today lies in scaling down the size of these devices, and thereby also hoping to reduce complexity and costs. Ultimately, there is a desire to reach dimensions compatible with the integration with smartphones and other small handheld devices. However, such miniaturization is challenging and amongst other challenges, present small-sized spectrometers suffer from limited spectral range and resolution.

A typical low-cost spectral sensor system consists of a light source, e.g. a lamp, and a spectrometer. The spectrometer should ideally fit in a mm-sized package and cost few tens of €, so that it can be widely deployed in industrial and consumer applications. However, typical methods to measure the light spectrum require at least cm-scale propagation distances, complex packaging and thereby large form factor and cost. This problem is particularly severe in the near-infrared (800-2000 nm) range, as no cost-effective detector or imaging arrays are available.

Following the above, there is a need for a smaller sized spectral sensor system which is less complex to fabricate and lower in costs.

SUMMARY OF THE INVENTION

It is an object of the present disclosure to provide a spectral sensor for spectral analysis of a sample under test with reduced form factor and lower costs.

Other objects of the present disclosure include devices and methods for manufacturing such spectral sensors and for providing spectral analysis of a sample under test.

In a first aspect, there is provided a multi-pixel spectral sensor for spectral analysis of a sample under test, the sensor comprising:

an array of pixel elements for generating a dataset comprising a plurality of data values corresponding to the pixel elements upon collection of light emitted, reflected or transmitted by the sample, each of the pixel elements comprising a stack of layers comprising:
  a first reflective structure, comprising one or more layers of reflective material;
  a second reflective structure, comprising one or more layers of reflective material, wherein the first and second reflective structures are arranged for reflecting the light from the sample;
  a phase tuning element, comprising a phase tuning material configured for resonant response to a defined set of wavelengths of the light;
  a detector element comprising a layer of photo active material arranged to define a photodetector, the photodetector being arranged to convert light of the set of wavelengths defined by the corresponding phase tuning element into a photocurrent;
  contact elements including conductive materials in electrical connection with the detector element for outputting the photocurrent;

the sensor further comprising:
  a read-out circuit, connected to each of the contact elements of the pixel elements for simultaneous read-out of a plurality of photocurrents to generate and output the dataset for the spectral analysis of the sample under test, and wherein the phase tuning element of each of the pixel elements is configured for a different sets of wavelength responses of the light and each photodetector of the pixel elements comprises of a semiconductor material.

Spectroscopy sensor systems or spectral sensor systems make use of sensor systems which reconstruct the optical spectrum of the analysed test object. Spectral sensors based on silicon detector arrays and filters may be combined with machine learning algorithms to reconstruct the properties of the sample. However, this spectral region only contains the weak high-order overtones of vibrations of molecular bonds and thereby the sensitivity of spectrometers operating in the visible is limited in many applications. In this perspective, compact spectrometers operating in the infrared (IR, 1-10 µm) are more attractive. IR spectroscopy may be employed in very diverse fields, ranging from environmental sensing, control of soils in agriculture, industrial quality monitoring and pharmaceutical industry. Yet, due to the high-price of IR detectors, current portable IR spectrometers make use of single-point detectors. Examples include Fourier-Transform Interferometers (FTIR) or micro-electro-mechanical systems (MEMS), which are sensitive to shocks and mechanical vibrations and suffer from reliability problems, making them impractical for most on-field applications.

Identification and classification of materials in the food and chemical industry is also increasingly performed using spectroscopy, and particularly diffuse reflectance spectrometry, as it is easy to implement, contactless and non-destructive. For example, the near-infrared (near-IR) reflectance spectrum provides information about freshness, sugar content and protein content of food. Spectrometry is also increasingly used in agriculture (ripeness), in the dairy industry (milk nutritional properties), in recycling industrial waste (identification of different polymers) and in pharmaceutical industry. Consumer applications will also become possible when such a system can be integrated within a smartphone. To this end, the spectral sensor system should be easy to manufacture, at relative low costs and with small form factor. In the first aspect, a sensor for such a spectral sensor system is provided.

The spectral sensor system is arranged to analyse a material, product or what so ever, i.e. in the form of a sample under test. The proposed sensor is different from typically known sensor systems which are based on gratings. The gratings split different colours in different paths, which in turn requires at least cm-scale propagation distances, complex packaging and thereby large form factor and cost. The proposed sensor however comprises an array of pixel elements with an array of resonant-cavity photodetector elements which define an array of pixel elements. These pixel elements generate a dataset comprising a plurality of data values corresponding to the pixel elements when the sample under test is illuminated with a light source such as one or more LED light(s), or emits light under excitation (photoluminescence), or inelastically scatters light under excitation (Raman spectroscopy)

The sensor thus has an array of pixels where each pixel has a different spectral response. Each sensor or detector has two reflective layers or mirrors disposed at a certain distance from each other, thereby forming an optical cavity. Between the two mirrors, a resonant-cavity photodetector elements are defined which comprise two distinct layers, one comprising phase tuning material for configuring a resonant response to defined sets of wavelengths of the light from the sample, and the other being photo active material which responds to the light by generating a corresponding photocurrent. Each resonant-cavity photodetector element preferably has a dedicated first and second (top, bottom) mirror. However, alternatively, the mirrors may also be continuous over multiple or all resonant-cavity photodetector elements. As indicated, the phase tuning layer and the photo active layer are configured such that an array of resonant-cavity photodetector elements is defined which form the array of pixel elements.

The phase tuning component of the resonant-cavity photodetector elements may include a metasurface with variable filling factor which sets the resonant wavelengths, which is varied over the array to cover the spectral range of interest. Alternatively, layers with different thickness, defined for example using grayscale lithography, can be used as phase tuning material. A semiconductor membrane may form the absorber or photo active element, converting the optical power into a photocurrent which can be measured and read-out by the read-out circuit for further processing on chip or outside of the sensor device.

Only light with a wavelength matching the cavity resonance(s) of the phase tuning elements is coupled to the cavity, and therefore detected. By combining the photocurrents simultaneously measured by the different detectors and read-out through the read-out circuit, and knowing their spectral response, it is possible to reconstruct the spectrum. From the spectrum, the properties of the sample can be reconstructed using well-known chemometrical analysis techniques. Alternatively, however, such reconstruction of the spectrum is not required. By performing a series of measurements of a calibration data sets (for example different types of milk with known properties), it is possible to train a neural network or other algorithms so that the properties of an unknown sample can be derived from a measurement with the spectral sensor, without previous spectral reconstruction. The chemometric techniques for identification, quantification and classification may therefore be performed directly on spectral sensor output data, without the intermediate step of spectral reconstruction. This is applicable for the sensor system according to the first aspect, but also for other aspects and for spectral analysis of a sample in which the sensor dataset has been obtained from currently known sensor systems.

The sensor according to the first aspect has many advantages over known sensors, e.g. by use of an array of resonant-cavity detectors with different spectral response to provide spectral information, the resolution of the sensor may relatively simply be upgraded to a higher resolution without significant increase of costs and form-factor. Also, with such different and configurable detectors or elements, the response may be configured according to certain requirements which suit a particular application or device. Moreover, the device structure of the resonant-cavity detector with a bottom reflecting layer, e.g. metallic mirror and top reflecting layer, e.g. Bragg mirror, may be integrated on Si using BCB bonding. Also, the use of a metasurface as phase tuning element within a resonant-cavity detector structure, allows the definition of a large number of different spectral responses in a single fabrication step. The robustness of the sensor to the spectral photo-response against angle and polarization variation is also improved. (The maximum change of the central resonant wavelength is 20 nm for 20 degrees). The sensor may also be bonded to the top of a CMOS read-out circuit (as a heterogeneous integration). Contrary to known sensor systems, the sensor according to any of the aspects may be based on a (single) lithographic process which results in reduced costs, whereas known sensor systems are based on deposition and/or removal of layers and/or films instead. With the proposed sensor, it is possible to improve the miniaturization to achieve device areas which are <6 mm^2. Also, the proposed sensor, due to the array of elements and the read-out circuitry, is able to simultaneously read-out multiple, and preferably, all photocurrents of the individual elements, which obviates the need for performing a plurality or sequence of measurements in time.

In a further example, each photodetector of the pixel elements includes an inorganic semiconductor material.

In a further example, each phase tuning element of the pixel elements comprises a photonic metamaterial, and wherein a fill factor of the phase tuning element of each of the pixel elements is varied for obtaining the different wavelength responses. Each phase tuning element of the pixel elements may comprise pillars of a material with high refractive index embedded in a material of lower index, in particular, dielectric or semiconductor materials, and wherein the pillars are arranged in a two-dimensional pattern. The phase tuning elements may be manufactured from a single lithographic step.

In a further example, each phase tuning element of the pixel elements comprises a dielectric or semiconductor material, and wherein a thickness of each of the phase tuning element is varied for obtaining the different wavelength responses.

In general, there are two different types of sensors, one (type I) being based on a metamaterial having a fill factor which is varied to obtain different wavelength responses for each resonant-cavity (photodetector) element, the other (type II) being based on a dielectric material of which the thickness is varied to obtain a different set of wavelength responses for each resonant-cavity (photodetector) element.

Hence, with the first type, type I, an RCE detector is proposed wherein the phase tuning element consists of a sub-wavelength grating of amorphous pillars which are embedded in a dielectric matrix. The choice of a-Si is due to the fact that it has high index (providing maximum index contrast) and its absorption is negligible at near-infrared (NIR) wavelengths. Thus, in this way the absorption coefficient is not affected by the variation of the metasurface volume. Here preferably a Ti/Pi/Au alloy is integrated at the bottom of the structure. Preferably, in some examples, this metal layer may also be used as a metal contact for the InP diode. Besides, the top mirror preferably is realized by a dielectric Bragg mirror consisting of two pairs of Silicon Oxide and amorphous Silicon (a-Si) layers.

In a further example, the thickness of each phase tuning element of the pixel elements is varied by a single grayscale lithographic step.

In a further example the read-out circuit is arranged for simultaneous read-out of each of the photocurrents to generate and output the dataset for the spectral analysis of the sample under test, the dataset comprising at least one sample of each of the pixel elements.

In a further example, the sensor further comprising a processing unit and a memory unit connected to the read-out circuit for processing the dataset, wherein the memory unit is arranged for storage of datasets comprising photocurrent values of the pixel elements of the sensor, and wherein the processing unit is further arranged to retrieve the properties of the sample from a training data set using linear or nonlinear regression routines or a machine learning routine.

As indicated, the sensor may comprise a processing unit and a memory unit for storage of a dataset or preferably a plurality of datasets obtained from calibration or learning measurements of one or more calibration samples. These calibration datasets are used to identify and quantify the chemical composition of materials and thus to identify the material itself. Conventional systems first generate a spectrum from which the further processing thereof is used to eventually identify the material or composition based on corresponding spectra. This however requires an additional inter-mediate process which takes time and requires resources. According to an example of any of the aspects, it is proposed to obtain the dataset of the photocurrents and compare these with datasets of known materials or compositions for eventual identification. Hence, it is possible to train a regression algorithm or a neural network so that the properties of an unknown sample can be derived from a measurement with the spectral sensor, without previous spectral reconstruction. The training or calibration dataset, according to an example, may either be generated on a distinct device, or in the device in which the sensor itself is used to perform the actual measurement of the sample under test.

In a further example, the sensor connected to one or more remote computational devices for retrieving the properties of the sample using the dataset.

In a further example, one or both of the first and second reflective structures comprise a metallic mirror.

In a further example, one or both of the first and second reflective structures comprise a Bragg mirror.

In a further example, each phase tuning element of the pixel elements comprises one or more of the group of InGaAs, InGaAsP, InAs/GaSb, InAs/InAsSb.

In an example, the sensor further comprises a bias circuit, in electrical connection with the contact elements or sequential flow of the photocurrent into the contact elements from the bias circuit, for generating light from the photo active material at the wavelengths set by the phase tuning element, and wherein the light is sent to the sample and the reflection or transmission from the sample is measured by a further detector or imaging camera.

In an example, a dataset of images is produced, and wherein the dataset is processed to retrieve the properties in different parts of the sample.

In another aspect, the sensor can be used not only as a detector but also as a multi-wavelength source. In this configuration, the sample can be sequentially illuminated with different wavelength bands and its spectral response is recorded via a standard photodetector or a camera array in view of applications in multi- and hyper-spectral imaging.

In a further aspect, method of manufacturing a multi-pixel spectral sensor for spectral analysis of a sample under test, the method comprising the steps of:

providing a silicon substrate;

applying a layer of reflective material as first reflective layer on top of the silicon substrate;

preferably, providing an insulation layer on top of the first reflective layer providing a layer of photo active material on top of the reflective material, or on top of the optional insulation layer;

patterning the photo active material by a lithographic manufacturing process defining a predefined array of detector elements;

developing the photo active material for obtaining the array of detector elements;

providing a layer of phase tuning material on top of the detector elements;

patterning the phase tuning material by a lithographic manufacturing process to define a predefined array of phase tuning elements;

etching the phase tuning material for obtaining the array of phase tuning elements;

providing a layer of reflective material as second reflective layer on top of the phase tuning elements.

In a further example, the steps of providing, patterning and developing the layer of phase tuning material comprises:

applying a layer of amorphous silicon on top of the detector elements;

patterning the amorphous silicon by a photolithographic process defining a single layered two-dimensional array of amorphous silicon pillars to define an array of detector elements;

etching the amorphous silicon for obtaining the array of detector elements.

In a further example, the steps of providing, patterning and developing the layer of phase tuning material comprises:

depositing a layer of gray-scale lithography material on top of the detector elements;

patterning the layer of gray-scale material by a lithographic process defining a single layered two-dimensional array of gray-scale elements to define an array of detector elements;

etching the gray-scale metamaterial to define a thickness of the array of detector elements.

These and other aspects of the invention will be apparent from and elucidated with reference to the embodiment(s) described hereinafter.

BRIEF DESCRIPTION OF THE DRAWINGS

FIG. 6a shows the measured transmission spectra for different filling factors (ff) of the metamaterial (device type I);

FIG. 6b shows the angular dependence of the transmission for a device having ff=0.65 (device type I);

FIG. 6c shows the measured reflection spectra for different ff of the metamaterial. A 5/5/200 nm Ti/Pt/Au metal mirror is used (device type I);

FIG. 6d shows the angular dependence of the reflection for a device having ff=0.65 (device type I);

DETAILED DESCRIPTION

What is proposed is a low-cost small-sized integrated spectral sensor based on multi-pixel resonant-enhanced detector arrays characterized by low angular dependence.

The proposed detector array, when combined with learning algorithms, can be used in real scenarios in food industry for classification purposes. Importantly, differently from standard mini-spectrometers that require full spectral reconstruction, such implementation can estimate the key attributes of materials directly from the photo-responses of the detector array resulting in a faster and more accurate prediction. In addition, what is shown, is that the devices can be operated as light-emitting diodes, opening new avenues for multi-spectral imaging with point-detectors. What is also presented are two different implementations, both supported by three-dimensional finite difference time domain (FDTD) simulations. Finally, the on-going experimental results are described towards a full device co-integrating both the filtering and the detection functionality.

Figure 1A:
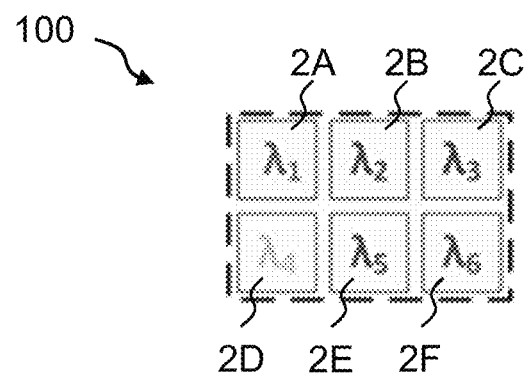
FIG. 1a shows an illustrative layout of the proposed multi-pixel sensor array.
Figure 1B:
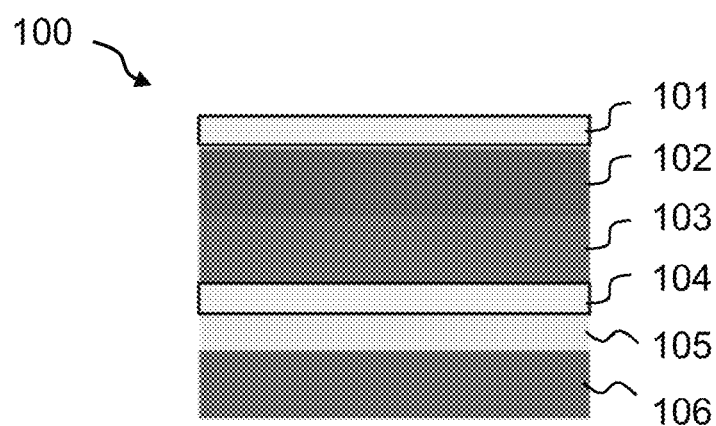
FIG. 1b shows an illustrative layer composition of the proposed resonant-enhanced photodetector integrated on a silicon wafer.

The core of the proposed spectral sensor, as illustrated in FIG. 1a and FIG. 1b, consists of a matrix of meta-pixels as shown in FIG. 1b, where each element 2A, 2B, 2C, 2D, 2E, 2F is a resonant-cavity-enhanced (RCE) detector with a unique spectral response. In the proposed solution, both an absorbing layer and a tuning element are embedded within a Fabry-Pérot cavity realized by two mirrors, as depicted in FIG. 1b. FIG. 1b shows several elements of the proposed sensor, being: a top mirror 101, a bottom mirror 104, a phase tuning element 102, a photo active element or absorber/diode 103, and a bonding layer 105 for the silicon wafer 106.

The top and the bottom mirrors can be realized by a) dielectric Bragg mirrors consisting of alternating pairs of low-index and high-index material b) metal layers such as Au or Ag with high reflectivity in the near-infrared c) A combination of (a) and (b).

Broadly speaking the co-integration of an optical cavity with an absorbing layer results in a wavelength-selective response and is commonly known as resonant-cavity enhanced detector. This configuration enables the use of thin absorbing layers to convert photons into electron-hole pairs, which are associated with low dark currents and thereby with an improved signal-to-noise ratio as compared to bulk detectors.

The absorbing layer 103 consists of a thin InP diode comprising an active InGaAs region or other heterostructure designed to absorb in the near- or mid-infrared. Here the incoming photons are converted into electron-hole pairs that can be efficiently collected at the n- and p-contacts of the diode. It is worth to mention that while the current detector array is designed to work in the near-infrared region (1-1.7 µm), the operation range of the detectors can be extended to the mid-infrared (MIR, 2-5 µm) by changing the material used as absorbing layer. Depending on the specific application, "extended InGaAs" (non-lattice-matched to InP), InGaAsSb alloys or Type II quantum wells based on InAs/GaSb or InAs/InAsSb superlattices can be used instead of lattice-matched InGaAs.

In order to fabricate a mirror 104 underneath the detector region, the active III-V semiconductor absorber is integrated on a silicon wafer 106 using an adhesive bonding layer 105 (see FIG. 1b). This hybrid technology shows several advantages: (1) the electrical read-out of the optical sensor can be realized using standard CMOS electronics, (2) the fabrication process can be carried out on large wafer sizes, (3) double-side processing capabilities allow us to incorporate a metallic layer or a dielectric multilayer below the epi-structure.

Existing solutions to change the optical response of a Fabry-Perot resonator consist in changing the layer stack in the DBR mirror, or in modifying the cavity length. These strategies have the drawback that they require log 2 N lithographic steps to realize N discrete pixels and therefore result in high fabrication costs as the number of pixels increases.

What is proposed are two distinct implementations for the tuning element 102 that allows individually tuning the spectral response of each pixel within a single lithographic step.

A) Device type I, where the effective optical path within an optical cavity can be varied by changing the effective refractive index composing the cavity. A way to implement this consists in using a planar grating that has dimensions smaller than the resonant wavelength supported by the cavity structure. In this way, the dimensions of the grating can be engineered in a single lithographic step to create meta-pixels with varying effective refractive indices. In an example a two-dimensional pattern composed of amorphous silicon pillars is proposed with sub-wavelength diameters.

B) Device type II, where the tuning element consists of a dielectric material with varying thickness which can be tuned by grey-scale lithography. In this scenario, the tuning element can be a resist sensitive to UV light or e-beam. A given dose in the lithographic step determines the thickness of the resist. Alternatively, the resulting multi-height pattern can be transferred to additional dielectric material such as Silicon Oxide or Silicon Nitride or a semiconductor layer via vertical dry etching. This layer forms the tuning element after removal of the resist.

Finally, another critical advantage of this scheme, compared for example to spectral discrimination based on external plasmonic filters, is the small angular dependence of each pixel. In fact, since the tuning element is embedded within the Fabry-Perot cavity, the angular dependence is inherited by the planar cavity and is not altered by the presence of the metamaterial.

In another aspect, the presented device concept can also be exploited as tunable light-emitting diodes (LEDs). Indeed, when operated in forward bias, the device of FIGS. 1a and 1b represents a resonant-cavity LED, whose emission spectrum can be tuned by the tuning element. The realization of tunable LEDs is very appealing for novel spectral sensing applications. In fact, instead of filtering the collected light from the sample—as typically done in standard transflectance spectroscopy—a spectral modulation can be directly implemented on the source instead of on the detector. This is particularly important for applications that require both the spectral and the imaging information since it allows using a commercial monochrome focal-plane array for multi- or hyper-spectral imaging. In this application, an array of LEDs with different spectral responses would be used, and an image would be taken with the focal plane array under illumination from each LED. The spectral and spatial information could then be combined to provide spectral information for each pixel.

Figure 2:
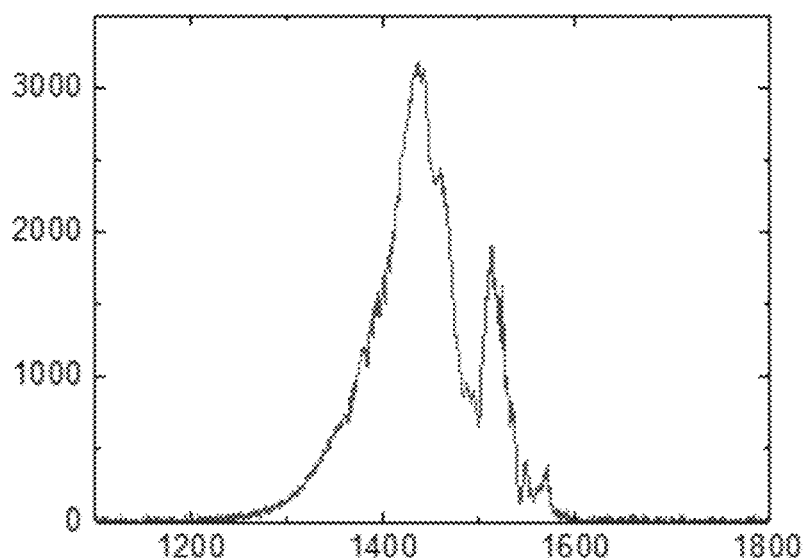
FIG. 2 shows a measured electro-luminescence when a forward bias (1.5V) is applied to the diode in another aspect.

FIG. 2 shows the measured emitted spectrum from a device without tuning element and top mirror (area 80×80 µm$^2$) when it is operated in forward bias (+1.5 V). In order to obtain efficient emission throughout the spectral range of interest, selective etching and regrowth could be used to combine active regions with different bandgaps, or several chips with different active regions could be combined in a single package.

In many scenarios, such as drug identification or crop analysis, spectrometers are used to classify different materials or extract the concentration of their single compositional elements. A commonly-used scheme employed in mini-spectrometers lies in the reconstruction of the optical spectrum from the global response of the device. Then, learning algorithms are applied to the extracted spectrum to identify its composition. These algorithms are typically run off-chip in a distributed network or in a cloud service. In the present disclosure, a method is proposed to avoid the computational cost associated with the spectral reconstruction by directly training an estimation algorithm on the photo-response of the individual pixels. The estimation algorithm can be implemented via a simple linear regression method or employing more complex artificial network architectures. For each specific application, a dataset comprising the photocurrent values of the meta-pixels is firstly built by collecting measurement data from a large set of target samples. Then this dataset is used to train a regression algorithm or an artificial neural network to map the measured photocurrent to a set of target categories or concentrations. The trained artificial neural network is finally integrated within the software of the spectrometer or in a processor in the cloud and enables the classification without the need for the off-chip spectral reconstruction.

Figure 3:
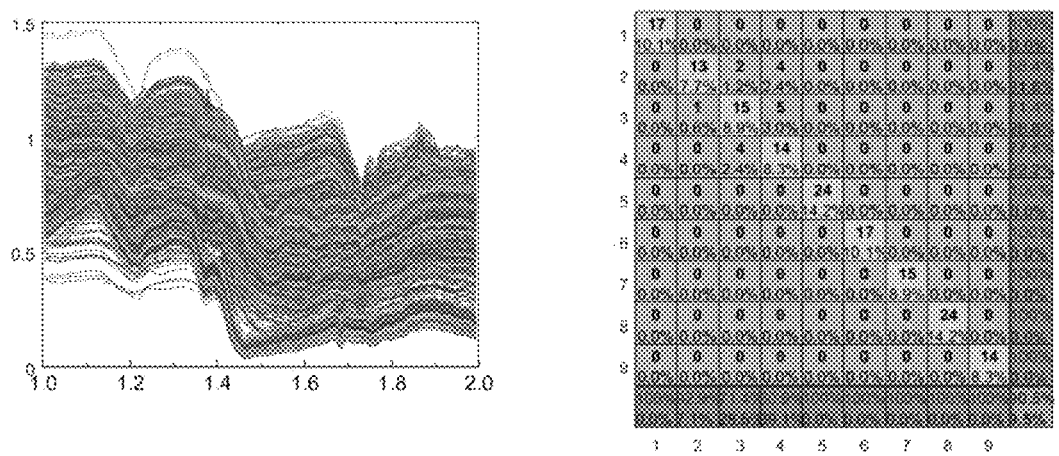
FIG. 3 shows raw input spectra of the 1125 sugar samples taken from literature (Melchert, F., Matros, A., Biehl, M., & Seiffert, U. (2016). "The sugar dataset: A multimodal hyperspectral dataset for classification and research.") and a test confusion matrix of the trained artificial neural network on the product of these spectra and the simulated multi-pixel response.

In order to give an example of this concept, the measured spectra dataset from nine sugar and their related compounds with common optical appearance are taken from the literature (as seen in FIG. 3), to create a dummy dataset of photocurrents. The dataset contains 1125 samples. Training methods are applied to the product of these spectra and the simulated absorbing function. A test of the trained artificial neural network gives a 90.5% success rate in classification as shown in the Confusion Matrix reported in FIG. 3.

Figure 4A:
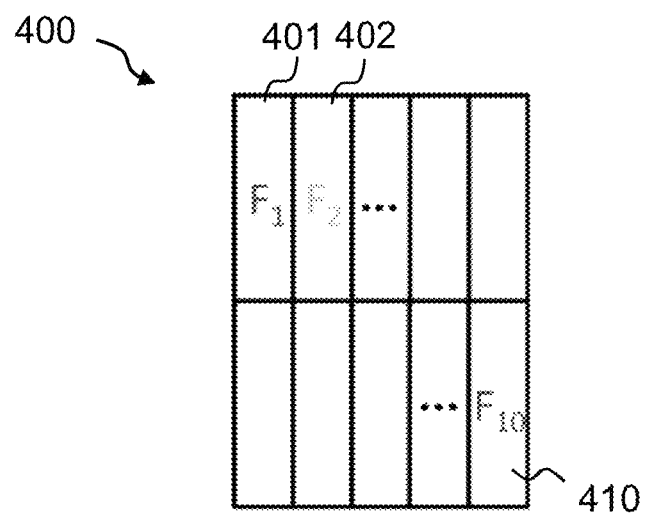
FIG. 4a shows an illustrative layout of the proposed multi-pixel sensor array.
Figure 4B:
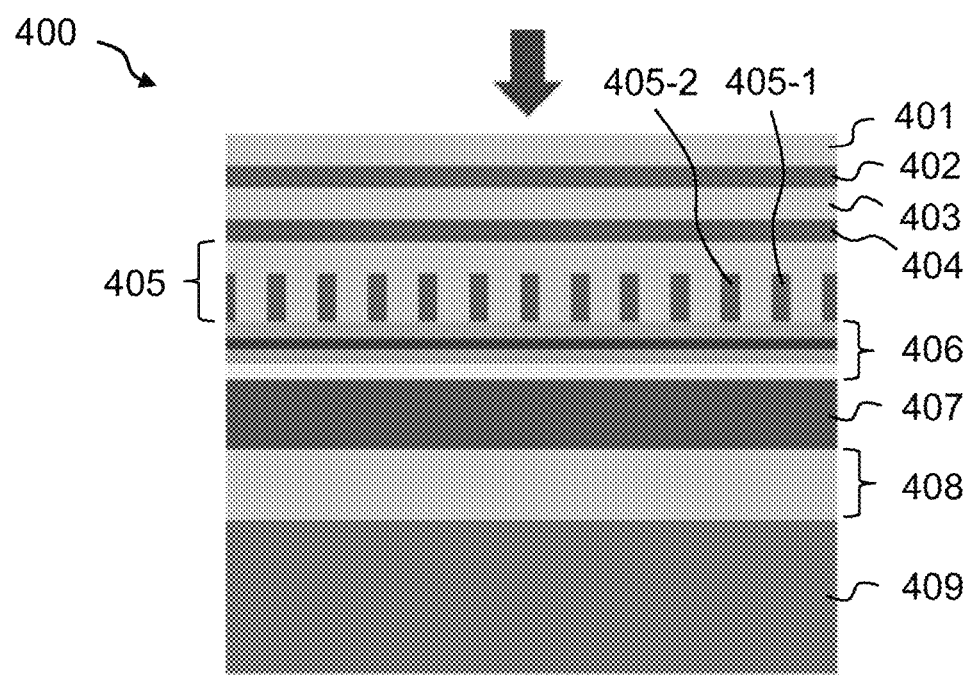
FIG. 4b shows an illustrative layer composition of the device type I proposed multi-pixel sensor array.

FIGS. 4a and 4b shows a proposed implementation of RCE detector, in lateral layout of the elements 401, 402, 403, 410 as in the layer in which the device is built up 401-409, where the tuning element 405 consists of a sub-wavelength grating of amorphous silicon pillars 405-1, 405-2, embedded in a dielectric matrix, i.e. the device type I as indicated above. The choice of a-Si 405 is due to the fact that it has high index (providing maximum index contrast) and its absorption is negligible at near-infrared (NIR) wavelengths. Thus, in this way the absorption coefficient is not affected by the variation of the metasurface volume. Here a Ti/Pi/Au alloy 407 is integrated at the bottom of the structure. This metal layer has two-fold functionality: a) it represents the bottom mirror of the optical cavity; b) it acts as a metal contact for the InP diode 406. Besides, the top mirror is realized by a dielectric Bragg mirror consisting of two pairs of Silicon Oxide 401, 403 and amorphous Silicon (a-Si) layers 402, 403. In the following firstly the simulation of this full structure is discussed. Later the experimental realization of its individual components is presented, which have been developed independently: dielectric filters based on metasurface tuning and detectors based on III-V membranes bonded on Silicon. Finally the on-going results in the realization of a full structure are shown, where these functionalities are monolithically integrated together to form a resonant-enhanced photodetector.

The thicknesses of the III-V layers 405, 406 and the metamaterial in FIG. 4b have been optimized to obtain sufficient absorption ($\alpha$=0.75) in the InGaAs layer, without compromising the tunability of the structure. In this regard, the spatial overlap between the optical modes and the active InGaAs layer has been maximized, while maintaining a sufficient mode overlap with the metamaterial.

Figure 5A:
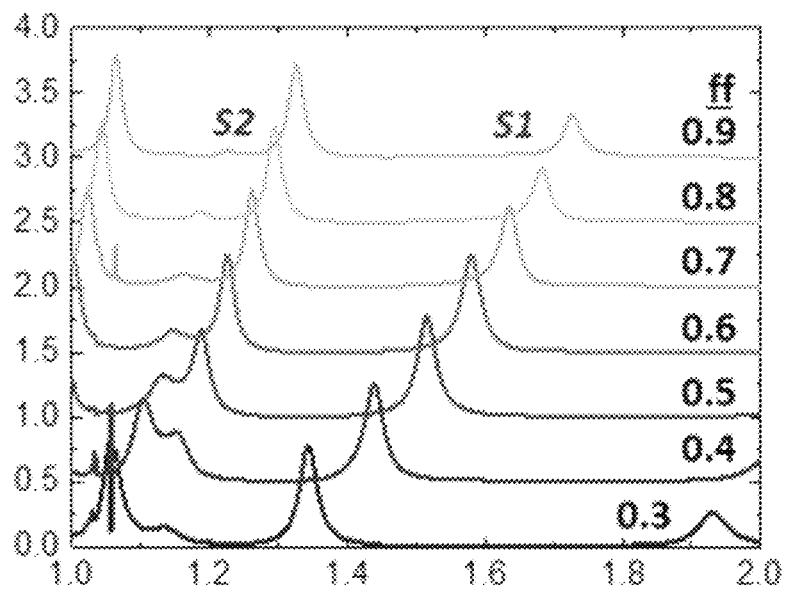
FIG. 5a shows the calculated absorption spectra for different filling factors of the metamaterial (device type I), in which the absorption of the Ti/Pt is not taken into account.
Figure 5B:
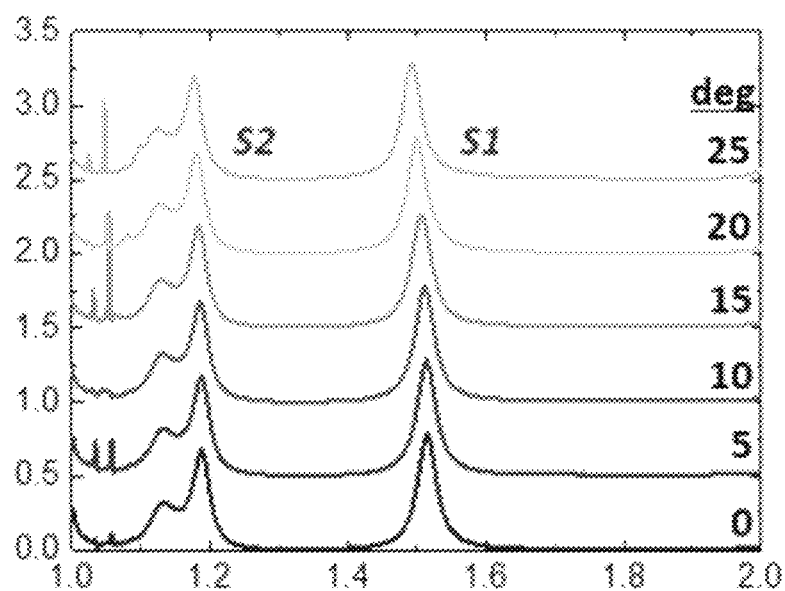
FIG. 5b shows the angular dependence of the absorption for a device having filling factor ff=0.5 (device type I)

FIG. 5 (a) shows the simulated absorption spectra for different filling factors (ff) of the metamaterial as calculated by FDTD methods. A ~380 nm red-shift is observed for the peak labelled S1 positioned around 1.5 µm, identified as the first-order mode of the structure when the filling factor is increased from 0.3 to 0.9. The maximum absorption of the resonant peak does not significantly vary when changing the filling factor from 0.3 to 0.7 of the metasurface. However, for larger filling factors, this value decreases by 50% since the resonance is closer to the cut-off wavelength of the InGaAs absorbing layer. In addition, the angular dependence of peak S1 shown in FIG. 5 (b) is characterized by a ~20 nm blue-shift for 25° change in the angle of the incident light, which is less than the full width half maximum (FWHM) of the resonant peak (~25 nm).

It should be noted that the presence of more than one peak does not prevent the numerical reconstruction of the spectrum or the direct determination of key-properties in sensing application, but instead enables the use of multiple peaks to cover a large spectral range (~1-1.7 µm).

Two categories of filters are proposed: transmission filters realized by fabricating a pair of Bragg mirrors at both sides of the metamaterial on a glass substrate and reflection filters where one of the Bragg mirrors is replaced by a metal alloy. FIG. 6(a) shows the measured transmission spectra as a function of the filling factor of the metamaterial. By increasing the filling factor from 0.25 to 0.95, the resonance located around 1400 nm red-shifts by 290 nm. This peak is characterized by an FWHM of ~25 nm in agreement with the simulated value. The spectrum is dominated by three peaks labelled T1, T2, and T3 attributed to the different FP resonances of the structure. FIG. 6(b) shows the angular dependence of these modes measured in transmission for a device with ff=0.65 of the metamaterial. Peaks T2 and T3 are characterized by a 35 nm and 20 nm blue-shift respectively, for 25° change in the angle of the incident light. Higher-order modes are characterized by smaller angular dependence, as expected for FP resonances.

Besides, in order to test the compatibility of the metafilter with a metal mirror made of 5/5/200-nm Ti/Pt/Au, it is proposed to fabricate a device similar to the one shown in FIG. 4, replacing the III-V layer with amorphous Silicon. This allows the investigation of the possible detrimental absorption in the metal for different metal alloys. FIG. 6(c) shows the reflection coefficient measured for different filling factors. 4 peaks labelled R1, R2, R3, and R4, can be distinguished, where peak R1 has an FWHM of ~23 nm. Importantly, a two-fold increase in the quality factor of these modes has been detected when the thickness of the Ti/Pt is reduced to 5/5 nm compared to the standard alloy commonly employed for p-contact (25/75 nm).

Notice, however, that in the following development for the NIR detector 15 nm of Ti is employed since a thickness of 5 nm was observed to be characterized by poor adhesion properties and a non-Ohmic behaviour of the electrical contacts.

FIG. 6(d) shows the angular dependence measured in reflection for a device with ff=0.65 giving shifts in the resonant wavelengths comparable to the values observed in transmission.

Figure 7:
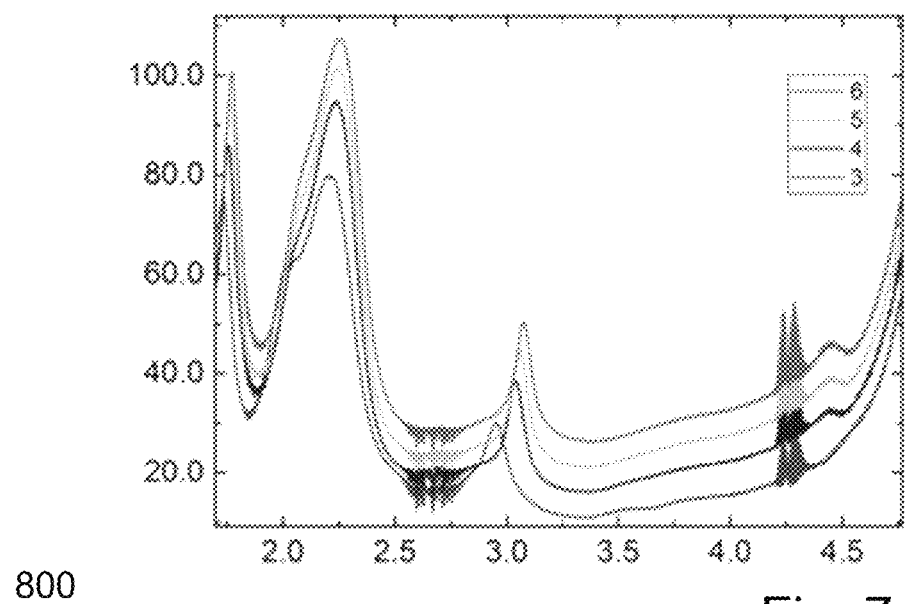
FIG. 7 shows metasurface filters extended in the mid-Infrared.

Finally, by adapting the pitch of metasurface and the thicknesses of Bragg mirror, transmission filters operating in other spectral regions can be designed. FIG. 7 shows the experimental transmission of metasurface-based filters designed for the mid-IR region.

Figure 8:
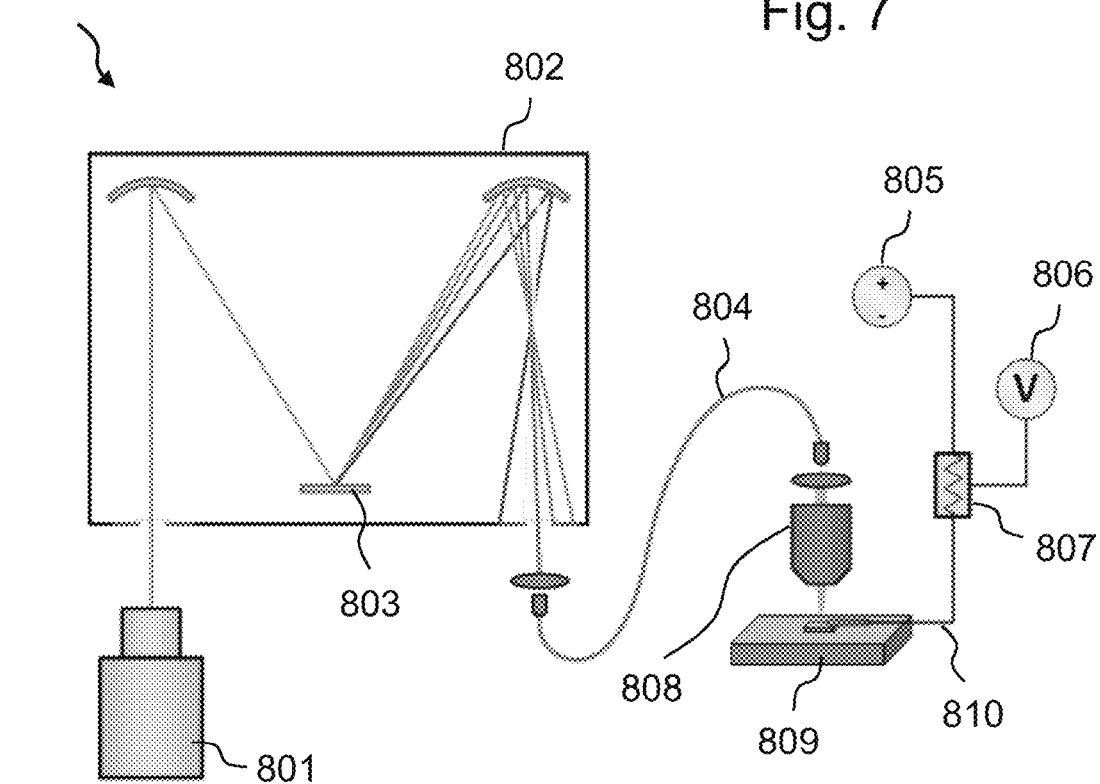
FIG. 8 shows an experimental setup employed to measure the photocurrent as a function of the wavelength.

Detectors based on an III/V membrane bonded on a Silicon wafer have been fabricated, which have the same epi-structure presented in FIG. 4 without the metamaterial layer and top mirror. The photocurrent is measured as a function of wavelength using the experimental setup illustrated in FIG. 8 for two metal alloys, type A composed of Ti/Pt/Au=25/75/200 nm and type B made of Ti/Pt/Au=15/5/200 nm. A tungsten lamp 801 is used as a broadband source, covering the NIR wavelength range. The light is filtered using a monochromator 802, 803 and then coupled into a multimode fiber 804 (diameter 550 µm, NA=0.22). The filtered light is focused on the sample 809 using a 50× objective 808 (NA=0.45) and the generated photocurrent is collected using a two-finger electrical probe 810.

Figure 9:
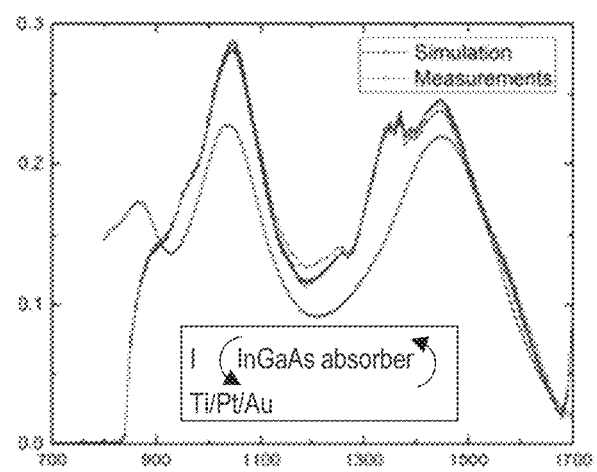
FIG. 9 shows the photoresponse of the InGaAs detector at 0 V bias without phase tuning element and top metal mirror for a type B device (the spectrum is not normalized with respect to the output spectrum of the Tungsten lamp, which is not completely flat over the full range of interest) the inset indicates: simulated spectral response of the InGaAs detector and the absorption of the Ti/Pt is not taken into account.

The photo response shown in FIG. 9 as a function of the wavelength as measured as voltage drop across a 10 kΩ load resistance and with 0 V applied bias for a type B device with an 80×80 µm2 active area. The spectral position of the broad resonances around 1 µm (FWHM~200 nm) and 1.3 µm (FWHM~300 nm) matches the simulated spectrum. These resonances are due to the FP oscillations within the resonator formed by the bottom metal mirror and the semiconductor-air interface. It is estimated that the absorption in the Ti/Pt layer causes a broadening of the measured peaks as compared to simulations.

Figure 10:
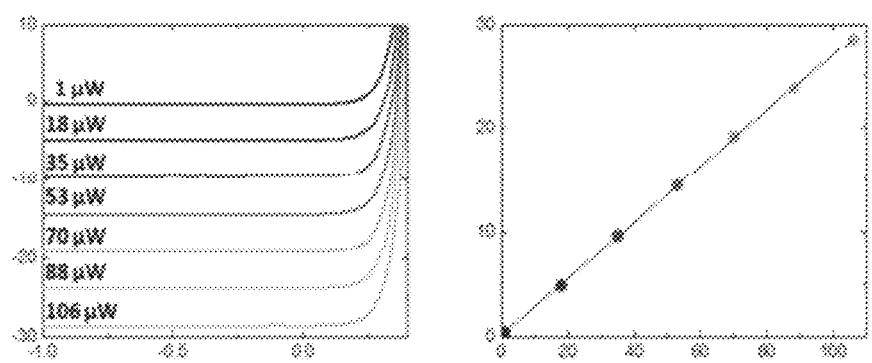
FIG. 10 shows IV curves for different incident laser powers at 1300 nm, and the photocurrent at 0 V as a function of the incident laser power.

An important figure of merit for photodetectors is the responsivity R, which can be determined by measuring the generated photocurrent as a function of the input power. For this purpose, current-voltage curves (IVs) are measured while the sample is illuminated with a 1300 nm laser at different laser powers. The measured photocurrent (measured on a type A device) is linear as a function of the incident light as shown in FIG. 10(b). For this device, a responsivity of R=0.27 A/W at 0 V is measured. This value is comparable with the simulated responsivity RS=0.24 A/W and is limited by the absorption in the Ti/Pt layers. In fact, the simulated responsivity of a detector with a gold layer as a mirror is RS2=0.6 A/W. This suggests that the optical performance can be improved by further optimization of the metal layer composition.

Finally, the measured dark current is ~1 pA at −1 V for type B devices, while it is observed that this value can be decreased by 3 orders of magnitude by employing type A detectors.

Figure 11:
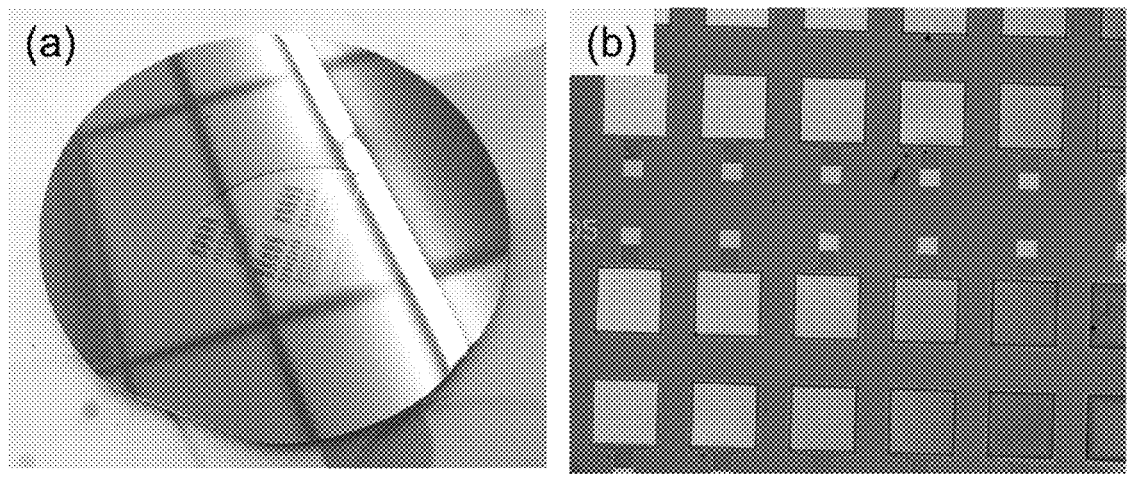
FIG. 11 shows an image of one-quarter of the III-V membrane bonded on a 3-inch silicon wafer, and a microscope Optical image of RCE array during the process.
Figure 12:
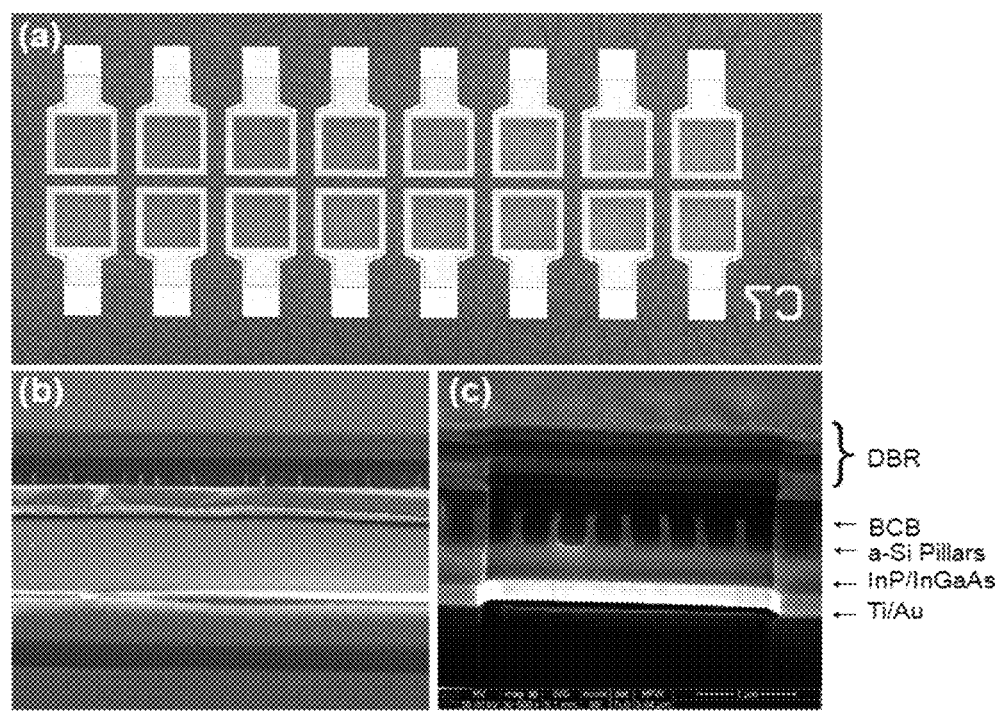
FIG. 12 shows 12 a top view (a) and cross-section (b,c) of scanning electron microscope pictures of the type I detector array after the fabrication process.

The final step in the realization of the multi-pixel detector array foresees the co-integration of the filter and the detector modules. A fabrication process for the realization of these devices has been developed. FIG. 11 shows a picture of the full wafer along with an optical microscope image of an array during the process. FIG. 12 shows the top view and the cross-section SEM pictures of a typical array at the end of the process.

Figure 13:
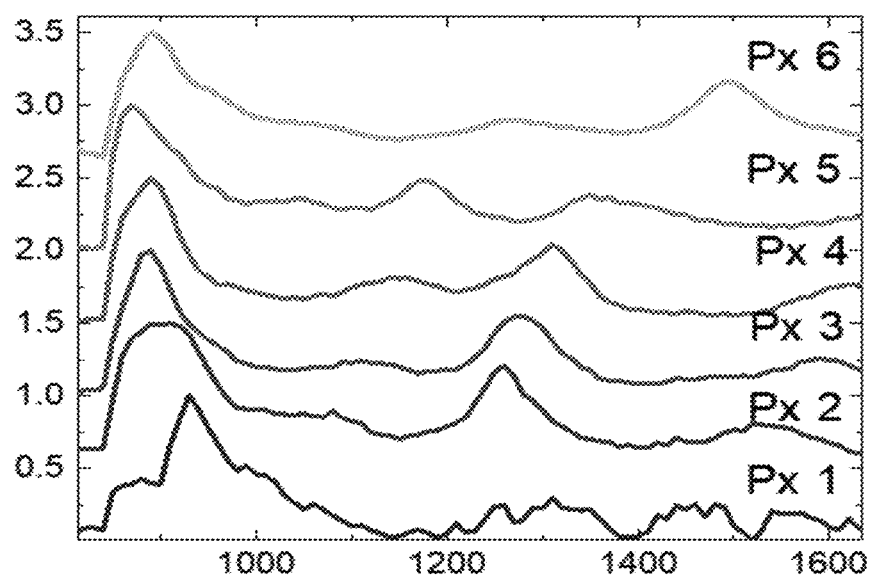
FIG. 13 shows photocurrent spectra collected from six pixels (Px) of a metasurface-based RCE detector array.

FIG. 13 shows the measured photo-current response from several pixels having varying filling factors. A clear tuning of the peak located around λ=1300 nm is evident, covering ~300 nm in wavelength in agreement with the tuning range predicted from simulations. Besides this mode shows an FWHM of 80 nm. The maximum responsivity in ~0.06 A/W, mainly limited by the residual absorption in the bottom metal layer.

Figure 14:
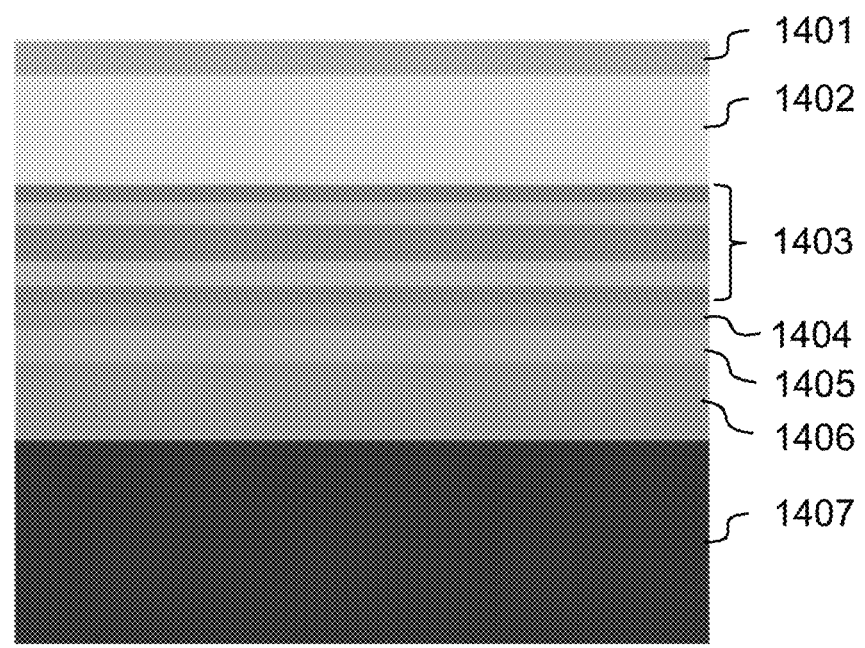
FIG. 14 shows a layout of the RCE detector, i.e. device type II, featuring tuning element controlled by grey-scale lithography.

An alternative way to change the optical path within a Fabry-Perot resonator simply consists in changing its physical dimensions. Typical approaches make use of a series of deposition and etching steps to have a varying height profile across a detector array. It is however proposed to use grey-scale lithography to control the thickness of a dielectric layer within the RCE detector. This layer consists of a material sensitive to UV light or electron beam dose, and it is typically a photoresist having a low-contrast curve. In this way, by controlling the dose in a single patterning step continuous range of height profile can be obtained. The proposed solution is illustrated in FIG. 14, where the gray-scale material 1402 is positioned on top of the InP diode 1403.

Here the optical cavity is realized by two metallic mirrors 1401, 1405, and the bottom mirror 1405 is separated from the absorbing region via an insulating layer 1404. Additional metal layers (not shown) are employed for the n- and p-contacts of the diode. In this configuration, the bottom mirror 1405 is not used as a diode contact, in order to decouple the optical and electrical performances of the device. Besides, differently from metasurface-based RCE detectors, this implementation does not require a planarization step for the grating.

Figure 15:
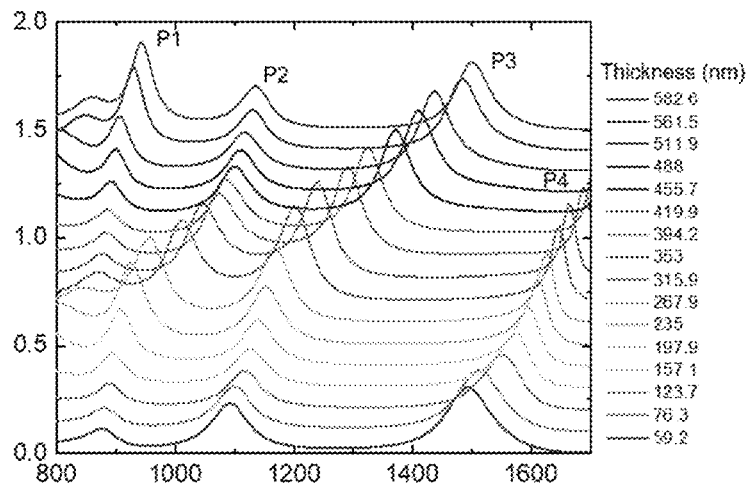
FIG. 15 shows a simulated responsivity for different thickness of the tuning element.

FIG. 15 shows the responsivity of the RCE detector (Type II) when simulated through FDTD methods. In this simulation the thickness of the tuning element is varied from ~60 to ~580 nm. The response curve of the detector is characterized by four distinct peaks (P1, P2, P3, P4), covering the NIR and SWIR range (from 800 nm to 1660 nm), that are associated with distinct modes of the FP resonator. These optical modes are characterized by an FWHM of ~60-80 nm and a maximum responsivity in the range of 0.25-0.3 A/W. When the thickness of the cavity is increased, a monotonic blue shift is observed in all the peaks. In particular, P3 is characterized by a tuning range of ~410 nm.

Figure 16:
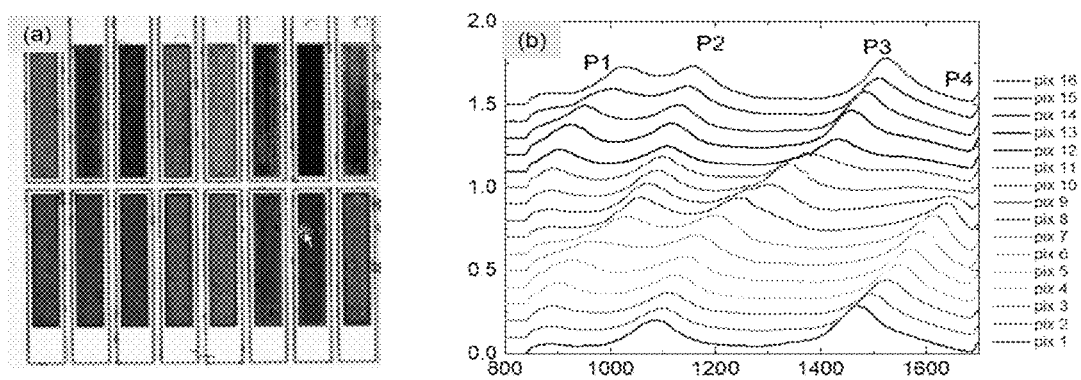
FIG. 16 shows the microscope Optical images of the full array of devices type II (dimensions ~1×1 mm2) and experimental spectral response of the RCE detector array.

A recipe for the fabrication of the full RCE detector type has been developed and optimized. A top view image of a detector array after the fabrication process is shown in FIG. 16 (*a*), where different color (in the visible range) corresponds to varying thickness of the tuning element. FIG. 16 (*b*) shows the measured spectral dependence of the photocurrents for different pixels. These responsivity curves qualitatively agree with the spectral behaviour expected from simulations. The four peaks characterizing the spectrum (P1, . . . , P4) have been associated with the 0th to the $3^{rd}$ order FP peaks obtained in simulations. The FHWM of the peaks varies from ~80 nm to ~100 nm, while a maximum single-peak tuning is 430 nm. The decrease in responsivity at 850 nm is due to a long-pass filter employed in the experiment. The residual deviation from the simulation is ascribed to a slightly different refractive index for the tuning element employed in the model. Importantly, the maximum responsivity for the peaks P3 and P3 is R=0.21 A/W and R=0.29 A/W, respectively.

The invention claimed is:

1. A multi-pixel spectral sensor for spectral analysis of a sample under test, the multi-pixel spectral sensor comprising:
- an array of pixel elements for generating a dataset comprising a plurality of data values corresponding to the pixel elements upon collection of light emitted, reflected or transmitted by the sample, each of the pixel elements comprising a stack of layers comprising:
- a first reflective structure comprising one or more layers of reflective material;
- a second reflective structure comprising one or more layers of reflective material, wherein the first and second reflective structures are configured for reflecting the light from the sample;
- a phase tuning element comprising a phase tuning material configured for resonant response to a defined set of wavelengths of the light;
- a detector element comprising a layer of photo active material configured to define a photodetector, the photodetector configured to convert light of the set of wavelengths defined by the corresponding phase tuning element into a photocurrent;
- contact elements including conductive materials in electrical connection with the detector element for outputting the photocurrent; and
- a read-out circuit connected to each of the contact elements of the pixel elements for simultaneous read-out of a plurality of photocurrents to generate and output the dataset for the spectral analysis of the sample under test, wherein the phase tuning element of each of the pixel elements is configured for a different set of wavelength responses of the light and each photodetector of the pixel elements comprises a semiconductor material.

2. The multi-pixel spectral sensor according to claim 1, wherein each photodetector of the pixel elements comprises an inorganic semiconductor material.

3. The multi-pixel spectral sensor according to claim 1, wherein each phase tuning element of the pixel elements comprises a photonic metamaterial, and wherein a fill factor of the phase tuning element of each of the pixel elements is varied for obtaining the different sets of wavelength responses.

4. The multi-pixel spectral sensor according to claim 3, wherein each phase tuning element of the pixel elements comprises pillars of a material with high refractive index embedded in a material of lower index, and wherein the pillars are arranged in a two-dimensional pattern.

5. The multi-pixel spectral sensor according to claim 3, wherein the phase tuning elements are manufactured from a single lithographic step.

6. The multi-pixel spectral sensor according to claim 1, wherein each phase tuning element of the pixel elements comprises a dielectric or semiconductor material, and wherein a thickness of each of the phase tuning element is varied for obtaining the different set of wavelength responses.

7. The multi-pixel spectral sensor according to claim 6, wherein the thickness of each phase tuning element of the pixel elements is varied by a single gray-scale lithographic step.

8. The multi-pixel spectral sensor according to claim 1, wherein the read-out circuit is configured for simultaneous read-out of each of the photocurrents to generate and output the dataset for the spectral analysis of the sample under test, the dataset comprising at least one sample of each of the pixel elements.

9. The multi-pixel spectral sensor according to claim 1, wherein the multi-pixel spectral sensor further comprises a processing unit and a memory unit operably coupled to the read-out circuit for processing the dataset, wherein the memory unit is configured for storage of datasets comprising photocurrent values of the pixel elements of the sensor, and wherein the processing unit is further configured to retrieve the properties of the sample from a training data set using linear or nonlinear regression routines or a machine learning routine.

10. The multi-pixel spectral sensor according to claim 1, wherein the multi-pixel spectral sensor is operably coupled to one or more remote computational devices configured for retrieving the properties of the sample using the dataset.

11. The multi-pixel spectral sensor according to claim 1, wherein at least one of the first and second reflective structures comprises a metallic mirror or at least one of the first and second reflective structures comprises a Bragg mirror.

12. The multi-pixel spectral sensor according to claim 1, wherein each phase tuning element of the pixel elements comprises one or more of the group of InGaAs, InGaAsP, InAs/GaSb, InAs/InAsSb.

13. The multi-pixel spectral sensor according to claim 1, further comprising a bias circuit, electrically coupled with the contact elements or sequential flow of the photocurrent into the contact elements from the bias circuit, configured for generating light from the photo active material at the set of wavelengths by the phase tuning element, and wherein the light is sent to the sample and the reflection or transmission from the sample is measured by a further detector or imaging camera.

14. The multi-pixel spectral sensor according to claim 13, wherein the multi-pixel spectral sensor is implemented as an array of light emitting diodes (LEDs) with different spectral responses, and wherein the multi-pixel spectral sensor is combined with a camera to illuminate a sample and to record with the camera a sequence of images generated with sources having different spectral responses, to retrieve the properties of different parts of the sample.

15. A method of manufacturing a multi-pixel spectral sensor for spectral analysis of a sample under test, the method comprising the steps of:
- providing a silicon substrate;
- applying a layer of reflective material as first reflective layer on top of the silicon substrate;
- providing a layer of photo active material on top of the reflective material;
- patterning the photo active material by a lithographic manufacturing process defining a predefined array of detector elements;
- developing the photo active material for obtaining the array of detector elements;
- providing a layer of phase tuning material on top of the detector elements;
- patterning the phase tuning material by a lithographic manufacturing process to define a predefined array of phase tuning elements;
- etching the phase tuning material for obtaining the array of phase tuning elements; and
- providing a layer of reflective material as second reflective layer on top of the phase tuning elements.

16. The method according to claim 15, further comprising the steps:
- providing an insulation layer on top of the first reflective layer; and
- providing the layer of photo active material on top of the insulation layer.

17. The method according to claim 15, wherein the steps of providing, patterning and developing the layer of phase tuning material comprises:
- applying a layer of amorphous silicon on top of the detector elements;
- patterning the amorphous silicon by a photolithographic process defining a single layered two-dimensional array of amorphous silicon pillars to define an array of detector elements; and
- etching the amorphous silicon to obtain the array of detector elements.

18. The method according to claim 15, wherein the steps of providing, patterning and developing the layer of phase tuning material comprises:
- depositing a layer of gray-scale lithography material on top of the detector elements;
- patterning the layer of gray-scale lithography material by a lithographic process defining a single layered two-dimensional array of gray-scale elements to define an array of detector elements; and
- etching the gray-scale metamaterial to define a thickness of the array of detector elements.

\* \* \* \* \*